United States Patent Office 2,970,133
Patented Jan. 31, 1961

2,970,133

POLYMERIZATION OF ETHYLENE WITH CATALYST CONSISTING OF ALUMINUM CHLORIDE AND TITANIUM TRIHALIDE

Thomas O. Sistrunk, Baton Rouge, La., assignor to Ethyl Corporation, New York, N.Y., a corporation of Delaware No Drawing. Filed Jan. 4, 1956, Ser. No. 557,242

4 Claims. (Cl. 260—93.7)

This invention relates to polymerization of hydrocarbon olefins and more particularly, but not exclusively, to a novel process for producing a new and unique solid polyethylene resin.

Polyethylene is one of the volume thermoplastic polymers now manufactured. It has many unique physical, chemical and electrical properties which make it a material of choice for many uses. However, possibly its greatest advantage is its inherent low cost, due principally to cheapness and availability of ethylene.

The commercial process for polyethylene is costly and difficult in operation. The process requires excessively high pressures of the order of 1500–3000 atmospheres necessitating expensive high pressure equipment and creating many hazards in large scale commercial operation. A large number and variety of other processes have been previously suggested for polymerization of ethylene and other olefinic hydrocarbons which operate at lower pressures. Essentially all these prior processes have been impractical because all or a substantial part of the product from the processes is liquids. A typical example of a process which produces viscous oils is disclosed in U.S. Patent No. 2,168,271, issued August 1, 1939. This patent polymerizes ethylene and similar olefins in the presence of aluminum chloride, zinc chloride, titanium chloride, and other Friedel-Crafts catalysts.

It is accordingly an object of this invention to provide an improved process for polymerizing hydrocarbon olefins. Still another object is to provide an improved polymeric material from hydrocarbon olefins, particularly ethylene. Still another object is to provide a process whereby hydrocarbon olefins, such as ethylene, can be polymerized to obtain essentially complete production of a solid polymer. Another object is to provide a process of the above type in which the polymer has a relatively uniform molecular weight and exhibits a relatively sharp melting point. A more limited object is to provide a materially improved polyethylene polymer having a drastically improved melting point, i.e., above about 120° C. and preferably above 130° C. which is highly linear and which has little or no unsaturation, particularly in the alpha olefin position.

It has now been found that these and other objects are accomplished if the olefinic hydrocarbon is contacted with a titanium subhalide, e.g., titanium dihalides and titanium trihalides. The product from this process, e.g., polyethylene, is essentially completely a solid polymer having a relatively high and uniform melting point, frequently about 130–135° C. The polymers are essentially completely linear and possess a very low unsaturation in the polymer chain, particularly in the alpha position. Likewise, the polymer has materially improved tensile strength and other similar physical properties.

It has also been found that aluminum chloride and similar Friedel Crafts catalysts are sometimes desirable when used in relatively small concentrations in the polymerization. Excessively high concentrations, i.e., above about a 5:1 molar ratio of aluminum chloride to titanium subhalide, gives large quantities of oils or other liquid products.

The following example is given to illustrate one mode of carrying out the process of this invention. In this and other examples which follow, the parts are given by weight unless otherwise noted.

Example I

An autoclave provided with a stirrer was charged in the absence of moisture or air with 250 parts of hexane containing 5 percent benzene, 2 parts of aluminum chloride and 1 part of titanium dichloride. The autoclave was closed and pressurized with 20 parts of ethylene, giving an initial (not equilibrium) pressure of about 20 p.s.i.g. The temperature of the autoclave was thereafter increased to 90° C. and maintained at this temperature for 3 hours. The autoclave was thereafter cooled to 45° C. and additional ethylene was charged to the autoclave (160 parts) to provide an equilibrium pressure of 600 p.s.i.g. Thereafter the temperature of the autoclave was again raised to 90° C. The pressure in the autoclave increased upon heating. Upon polymerization, the temperature of the autoclave increased to a maximum of 98° C. and the pressure decreased, at which time heating was discontinued. The autoclave was allowed to stand and cool. The product is a solid having a high melting point and having very desirable physical and chemical properties.

Example II

Example I was repeated except that only 5 parts of titanium dichloride is employed and all the ethylene was charged to the reactor at one time.

Example III

Example I is repeated except that benzene is employed as the solvent. The polymer is highly insoluble in organic solvents, such as toluene and decahydronaphthalene.

When the above examples are repeated using other titanium subhalides, such as titanium di- and tribromide, titanium di- and triiodide, titanium di- and trifluoride or mixed halides, such as compounds or mixtures having empirical compositions corresponding to titanium monochloride monobromide, titanium difluoride monochloride, titanium monochloride monofluoride, titanium monochloride dibromide, titanium dichloride monoiodide, and titanium dibromide monofluoride or mixtures of these complex salts, similar results are obtained.

Example IV

Example I is repeated except that hexane having a purity of 99.9 percent is used as the solvent. Similar results are obtained.

Other solvents or mixtures of solvents can be employed with similar results. Typical examples of suitable solvents are butane, heptane, octane, decane, and higher alkane hydrocarbons. Aromatic hydrocarbons, such as toluene and xylene are also suitable for this invention. Other solvents can be employed which are inert under the reaction conditions.

The quantity of solvent is not in any way critical and in fact quantities of solvent as low as 20 parts and as high as 600 parts per total charge of ethylene (usually 50 to 500 parts) have been employed with very satisfactory results. When a solvent is used, the higher concentrations are frequently preferred since the solvent aids in removing the heat of polymerization and permits the maintenance of uniform temperature conditions throughout the polymerization zone. Also, a solvent permits easier continuous polymerization operation. In addition, the properties of the polymer can frequently be varied by selecting solvents having different solubility for the hydrocarbon polymer. Essentially pure aromatic solvents are normally preferred.

Example V

Example I is repeated in the absence of any solvent. Similar results are obtained. When the polymerization is carried out using bulk polymerization as above, a preferred technique involves the use of a fluidized bed in which the catalyst is suspended within or carried through the reaction zone by the fresh gaseous monomer, e.g., ethylene. Either a stationary bed or moving bed can be employed. Particularly when employing a stationary fluidized bed, it is frequently desired to use other inert fluidizing media, such as alumina, silica, activated carbon and the like as a catalyst carrier. Other inert solids can be employed. When employed, these solids can be used in a weight ratio, i.e., inerts/aluminum of 1:10 to 200:1, preferably 1:5 to 20:1.

Example VI

Example I was repeated except that 200 parts of propylene were employed instead of the ethylene. Essentially quantitative conversion of the propylene is obtained.

Example VII

Example I is repeated except that 200 parts of isobutylene is employed instead of ethylene. Essentially complete polymerization of the isobutylene is obtained.

When the above examples are repeated employing styrene, butadiene, or isoprene, similar results are obtained. Typical examples of other suitable hydrocarbon olefins are 1-butene, 1-pentene, 1-hexene, 1-octene, 1-dodecene, 2-butene, 2-pentene, 2-hexene, 2-octene, 2-methyl-1-butene, 3-methyl-1-butene, 4-methyl-1-pentene, 4-vinylcyclohexene, 2-methyl-2-isobutylene, ethylene-butadiene, ethylene-styrene, and isobutylene-isoprene.

The temperature of the polymerization is not critical, as illustrated by the above examples, but is important. In general, temperatures ranging from 0°–250° C. are satisfactory, although from 50°–150° C. is preferred. Likewise, a wide range of pressures can be used, from sub-atmospheric to 3000 atmospheres or higher. Generally, between above 1 and 100 atmospheres of monomer pressure is preferred. In addition, other inert atmospheres such as nitrogen or hydrogen, can be employed and is sometimes desired.

The polymers of this invention are useful in essentially all of the many applications of polyethylene and other thermoplastics now manufactured. Specifically, the products can be used in the production of sheets, films, fibers, coating and molded articles. The material can be extruded, injection molded and processed by other conventional techniques. It is particularly useful for electrical insulation, bottles, toys and in some cases structural applications. The greater crystallinity of this material makes it particularly suitable for fibers, end uses wherein it is subjected to relatively high temperatures, and uses requiring additional rigidity and improved strength properties, such as tensile strength.

I claim:

1. A process for the production of solid polyethylene comprising contacting ethylene with a catalyst at a temperature up to 98° C., said catalyst consisting of a titanium trihalide and aluminum chloride, the aluminum chloride to titanium trihalide molar ratio being less than 5:1.

2. The process of claim 1 wherein said catalyst is titanium trichloride and aluminum chloride.

3. A process for the production of a solid polymer selected from the group consisting of polyethylene and polypropylene which comprises contacting an olefin selected from the group consisting of ethylene and propylene with a catalyst at a temperature up to 98° C., said catalyst consisting of a titanium trihalide and aluminum chloride, the aluminum chloride to titanium trihalide molar ratio being less than 5:1.

4. A process for the production of solid polypropylene comprising contacting propylene with a catalyst at a temperature up to 98° C., said catalyst consisting of a titanium trihalide and aluminum chloride, the aluminum chloride to titanium trihalide molar ratio being less than 5:1.

References Cited in the file of this patent

UNITED STATES PATENTS

| | | |
|---|---|---|
| 1,939,005 | Guthke | Dec. 12, 1933 |
| 2,344,213 | Otto | Mar. 14, 1944 |
| 2,567,109 | Howard | Sept. 4, 1951 |
| 2,721,189 | Anderson et al. | Oct. 18, 1955 |
| 2,773,836 | Shalit et al. | Dec. 11, 1956 |
| 2,899,416 | Schreyer | Aug. 11, 1959 |

FOREIGN PATENTS

| | | |
|---|---|---|
| 874,215 | Germany | Apr. 20, 1953 |

OTHER REFERENCES

Ruff et al.: "Zeitschrift fur Anorganische Chemie," vol. 128, page 84, February 23, 1923.

UNITED STATES PATENT OFFICE
CERTIFICATE OF CORRECTION

Patent No. 2,970,133                       January 31, 1961

Thomas O. Sistrunk

It is hereby certified that error appears in the above numbered patent requiring correction and that the said Letters Patent should read as corrected below.

Column 1, line 63, for "about" read -- above --.

Signed and sealed this 3rd day of October 1961.

(SEAL)
Attest:

ERNEST W. SWIDER                       DAVID L. LADD
Attesting Officer                        Commissioner of Patents

USCOMM-DC